No. 790,576.   Patented May 23, 1905.

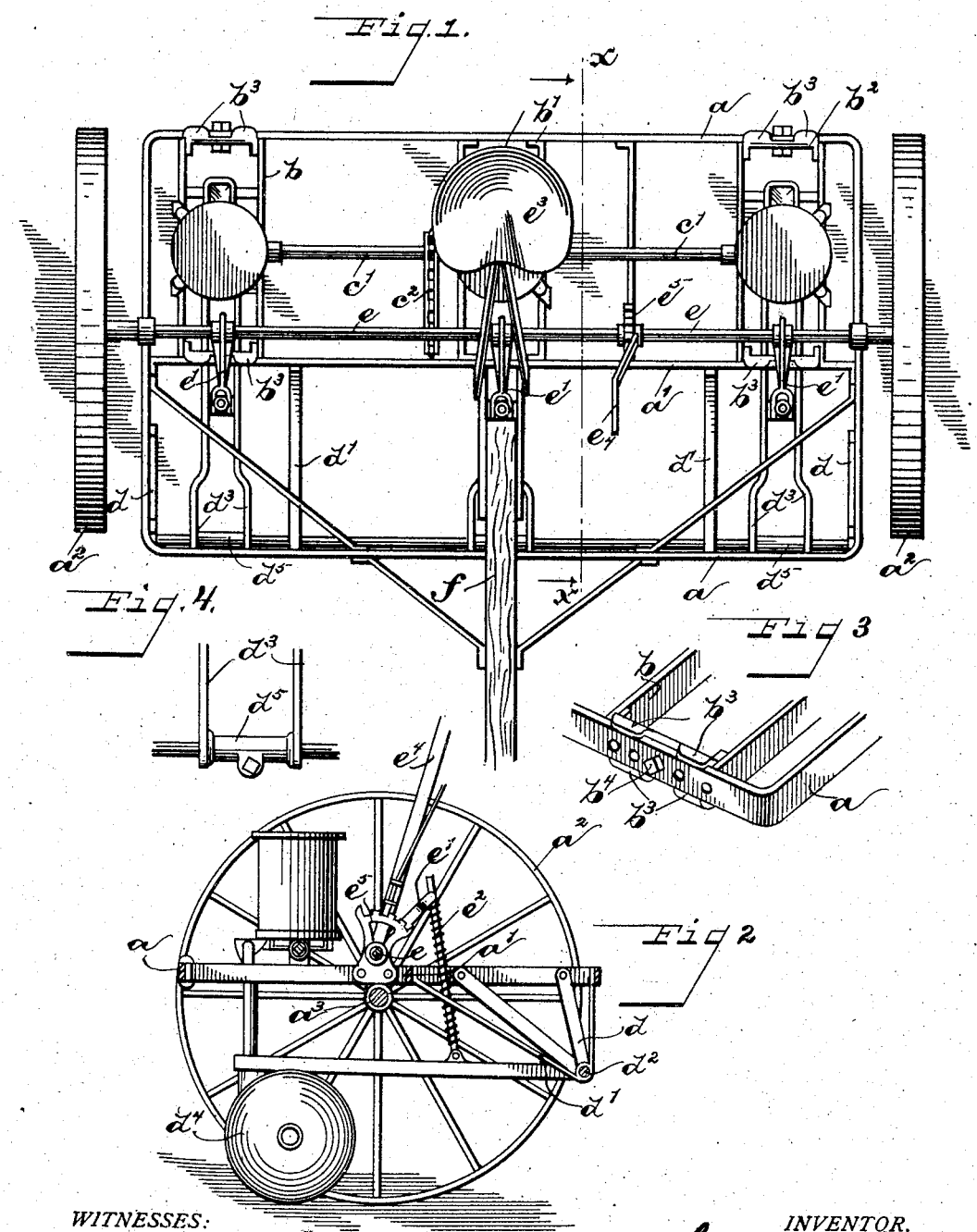

UNITED STATES PATENT OFFICE.

SYLVESTER H. JONES, OF RICHMOND, INDIANA, ASSIGNOR TO AMERICAN SEEDING MACHINE COMPANY, OF JERSEY CITY, NEW JERSEY, A CORPORATION OF NEW JERSEY.

SEEDING-MACHINE.

SPECIFICATION forming part of Letters Patent No. 790,576, dated May 23, 1905.

Application filed February 27, 1905. Serial No. 247,418.

*To all whom it may concern:*

Be it known that I, SYLVESTER H. JONES, a citizen of the United States, residing at Richmond, in the county of Wayne and State of Indiana, have invented certain new and useful Improvements in Seeding-Machines, of which the following is a specification.

My invention relates to seeders and planters, and more particularly to seeding-machines for planting corn or like grains which are to be placed in comparatively widely separated rows.

The object of my invention is to greatly simplify the construction, as well as the means and mode of operation, of such machines, whereby they will not only be cheapened in construction, but will be rendered more efficient in operation, and, further, to provide means for adjusting said machines to plant the grain in rows of various widths.

A further object is to provide means whereby the operator may control the depth to which the said grain is planted and provide means for raising the planting devices to an inoperative position.

With the above primary and other incidental objects in view my invention consists of the construction, details, parts, or their equivalents hereinafter described, and set forth in the claims.

In the drawings, Figure 1 is a plan view of the planter embodying my invention. Fig. 2 is a sectional view on line $xx$ of Fig. 1. Fig. 3 is a detail view of the connection of the adjustable supplemental frame hereinafter described. Fig. 4 is a detail view of the adjustable connection of the drag-bars.

In constructing my device I employ a rectangular main frame $a$, preferably of metal, but which may be constructed of other material, said frame being longitudinally divided by a cross-bar $a'$. Carrying-wheels $a^2$ are provided, which are secured upon the axle $a^3$, which extends from side to side of the frame, being provided with suitable bearings therein and adapted to rotate with said wheels.

Secured upon the main frame $a$ are a plurality of seeding devices, each of which is mounted on its corresponding supplemental frame $b\ b'\ b^2$. In the drawings I have shown three sets of planting devices; but the number may be varied as desired. The intermediate supplemental frame $b'$ is preferably stationary in the frame $a$, while the supplemental frames $b\ b^2$, located on each side of same, are adjustable therein. The supplemental frames $b\ b^2$ have provided on their rearward and forward ends projecting lugs $b^3\ b^3$, adapted to engage the rear bar of the frame $a$ and longitudinal bar $a'$. By this means the supplemental frames are laterally adjustable in said main frame and are adapted to be secured in their adjusted position by the bolt $b^4$. Each of the supplemental frames supports a seed-hopper and the usual feeding devices. The feeding devices are adapted to be operated by a common shaft $c'$, which is rotated by a chain-and-sprocket driving connection $c^2$ from the axle $a^3$.

Secured in the brackets $d$, attached to the ends of the rectangular frame $a$, and in auxiliary brackets $d'$, attached to the forward cross-bar of the main frame and the longitudinal bar $a'$, is a transverse shaft $d^2$, to which are pivotally secured the drag-bars $d^3$ of the furrow-openers $d^4$. The drag-bars $d^3$ are laterally adjustable upon the shaft $d^2$ and are secured in their adjusted position by means of a spreader $d^5$, interposed between the ends of said drag-bars $d^3$. The spreader $d^5$ is adapted to be clamped upon the shaft $d^2$, as shown in detail, Fig. 4.

Extending transversely across the main frame and preferably at a point immediately over the axle $a^3$ is a shaft $e$, provided with a series of presser-arms $e'$, one of said arms being provided for each of the furrow-opening devices. The arms $e'$ are connected with said furrow-opening devices by a spring-pressure rod $e^2$. Adjacent to the operator's seat $e^3$ there is provided a hand-lever $e^4$, secured to said shaft $e$ and equipped with the usual rack $e^5$, by which pressure may be applied to said furrow-opening devices, or by the reversal of said lever said furrow-opening devices through the presser-arm $e'$ and the rod $e^2$ may be elevated to an inoperative position.

A tongue $f$, secured to the forward part of the machine, as shown in Fig. 1, provides a means for propelling the machine.

It is to be understood that while the series of seeding devices are driven by a single driving connection $c^2$ each of said seeding devices might be provided with a separate driving device and the continuous shaft $c'$ may be dispensed with. It is further obvious that each of the furrow-opening devices might be provided with an independent operating-lever instead of operating all of said devices simultaneously by a single lever, as shown.

It will be seen that I thus provide a simple compact construction in which the distance between the rows of planted grain may be varied by the lateral adjustment of the supplemental frames $b$ $b^2$ within the main frame $a$ and a corresponding adjustment of the furrow-opening devices upon the shaft $d^2$. The said construction will be efficient in operation and unlikely to get out of repair.

Having thus described my invention, I claim—

1. In a seeding-machine as described, a rectangular main frame, carrying-wheels therefor, auxiliary frames, seeding devices mounted thereon, projections on said auxiliary frames extending above and below, and thus engaging transverse portions of said main frame whereby said auxiliary frames may be laterally adjusted, a shaft transversely arranged and supported on said main frame, furrow-opener drag-bars pivoted on said shaft, spreaders between the ends of said drag-bars, and means for clamping said spreaders to said shaft to secure said drag-bars in their adjusted position, substantially as specified.

2. In a seeding-machine as described, a rectangular main frame, a main operating-shaft, carrying-wheels on said shaft, auxiliary frames, projecting ledges on the forward and rear sides of said auxiliary frames forming channels engaging the transverse portions of said main frame, seeding devices mounted on said auxiliary frames, a common actuating-shaft for said seeding devices, a driving connection between the main shaft and said actuating-shaft, and laterally-adjustable furrow-openers, substantially as specified.

3. In a seeding-machine as described, a rectangular main frame, auxiliary frames adjustably mounted in said main frame, seeding devices on said auxiliary frames, an actuating means for said seeding devices, furrow-openers, a transverse shaft to which the drag-bars of said furrow-openers are pivotally attached, spreaders on said transverse shaft and interposed between the ends of said drag-bars, means for clamping said spreaders on said shaft to retain the drag-bars in their adjusted position, a rock-shaft, a lever for oscillating said rock-shaft, spring-pressure and lifting devices for said furrow-openers, a plurality of laterally-adjustable arms mounted on said rock-shaft, forming parts of said spring-pressure and lifting devices, substantially as specified.

In testimony whereof I have hereunto set my hand this 21st day of February, A.D. 1905.

SYLVESTER H. JONES.

Witnesses:
ELMER E. TOWLE,
FRANK E. PIERSON.